US012581494B2

(12) United States Patent
Low et al.

(10) Patent No.: US 12,581,494 B2
(45) Date of Patent: Mar. 17, 2026

(54) UPLINK DATA GRANT SCHEDULING

(71) Applicant: GREATER SHINE LIMITED, New Taipei City (TW)

(72) Inventors: Su-Lin Low, San Diego, CA (US); Chun-I Lee, San Diego, CA (US); Hong Kui Yang, San Diego, CA (US)

(73) Assignee: GREATER SHINE LIMITED, New Taipei City (TW)

( * ) Notice: Subject to any disclaimer, the term of this patent is extended or adjusted under 35 U.S.C. 154(b) by 360 days.

(21) Appl. No.: 17/950,301

(22) Filed: Sep. 22, 2022

(65) Prior Publication Data

US 2023/0014887 A1 Jan. 19, 2023

Related U.S. Application Data

(63) Continuation of application No. PCT/US2021/025758, filed on Apr. 5, 2021.
(Continued)

(51) Int. Cl.
 *H04W 72/23* (2023.01)
 *H04W 28/02* (2009.01)
 (Continued)

(52) U.S. Cl.
 CPC ....... *H04W 72/23* (2023.01); *H04W 28/0278* (2013.01); *H04W 72/543* (2023.01); *H04W 72/569* (2023.01)

(58) Field of Classification Search
 CPC ............. H04W 72/23; H04W 28/0278; H04W 72/543; H04W 72/569
 See application file for complete search history.

(56) References Cited

U.S. PATENT DOCUMENTS

2016/0119945 A1* 4/2016 Fang ................. H04W 28/0278
 455/450
2017/0318594 A1 11/2017 Babaei et al.
 (Continued)

FOREIGN PATENT DOCUMENTS

CN 103313396 A 9/2013
CN 108702647 A 10/2018
 (Continued)

OTHER PUBLICATIONS

International Search Report issued in International application No. PCT/US2021/025758, mailed Jul. 23, 2021.
(Continued)

*Primary Examiner* — Phirin Sam
*Assistant Examiner* — Tarell A Hampton
(74) *Attorney, Agent, or Firm* — BAYES PLLC

(57) ABSTRACT

Embodiments of apparatus and method for uplink grant handling are disclosed. In one example, a method for uplink grant handling can include receiving an uplink grant at a user equipment from a network device. The method can also include associating the uplink grant directly with a logical channel group including a plurality of logical channels. The user equipment can be configured to dequeue the logical channel group directly with priority for transmission scheduling. In some embodiments, the method can further include sending, to the network device from the user equipment, a request to associate a list of logical channel groups including the logical channel group. The request to associate can include a request to associate the plurality of logical channels with the logical channel group.

16 Claims, 10 Drawing Sheets

Related U.S. Application Data

(60) Provisional application No. 63/023,557, filed on May 12, 2020.

(51) Int. Cl.

| | | |
|---|---|---|
| *H04W 72/543* | (2023.01) | |
| *H04W 72/566* | (2023.01) | |

(56) References Cited

U.S. PATENT DOCUMENTS

| | | | | |
|---|---|---|---|---|
| 2017/0318595 | A1 | 11/2017 | Dinan et al. | |
| 2018/0077719 | A1* | 3/2018 | Nory | H04W 72/21 |
| 2018/0302918 | A1* | 10/2018 | Shaheen | H04W 76/27 |
| 2018/0310309 | A1* | 10/2018 | Koskela | H04L 47/30 |
| 2019/0053260 | A1 | 2/2019 | Shaheen | |
| 2019/0268918 | A1* | 8/2019 | Baghel | H04W 4/40 |
| 2021/0058812 | A1* | 2/2021 | Chai | H04W 72/21 |
| 2022/0061055 | A1* | 2/2022 | Freda | H04W 72/1263 |

FOREIGN PATENT DOCUMENTS

| | | |
|---|---|---|
| CN | 110651528 A | 1/2020 |
| WO | 2017171912 A1 | 10/2017 |
| WO | 2018202152 A1 | 11/2018 |
| WO | 2018232307 A1 | 12/2018 |

OTHER PUBLICATIONS

Written Opinion of the International Searching Authority issued in International application No. PCT/US2021/025758, mailed Jul. 23, 2021.

Extended European Search Report issued in corresponding European application No. 21805259.5, mailed Jun. 27, 2023.

First Office Action issued in corresponding Chinese Application No. 202180031959.X, dated Mar. 28, 2025, 15 pages.

The Second Office Action issued in corresponding Chinese Application No. 202180031959.X, dated Oct. 31, 2025, 19 pages.

\* cited by examiner

UPLINK DATA GRANT SCHEDULING

CROSS-REFERENCE TO RELATED APPLICATIONS

This application is a continuation of International Application No. PCT/US2021/025758, filed Apr. 5, 2021, which claims the benefit of priority to U.S. Provisional Application No. 63/023,557, filed May 12, 2020, entitled "5G OPTIMIZED UPLINK DATA GRANT SCHEDULING WITH LATENCY DERIVED LOGICAL CHANNEL GROUPING," both of which are hereby incorporated by reference in their entireties.

BACKGROUND

Embodiments of the present disclosure relate to apparatuses and methods for wireless communication.

Wireless communication systems are widely deployed to provide various telecommunication services such as telephony, video, data, messaging, and broadcasts. In wireless communications, there may be uplink communications from a user equipment to a base station and downlink communications from the base station to the user equipment. The base station may control uplink communications from the user equipment to the base station by providing an uplink grant to the user equipment to permit the user equipment to communicate in uplink at a scheduled time.

SUMMARY

Embodiments of apparatus and method for uplink (UL) grant handling are disclosed herein.

In one example, a method for uplink grant handling can include receiving an uplink grant at a user equipment from a network device. The method can also include associating the uplink grant directly with a logical channel group including a plurality of logical channels.

In another example, a method for uplink grant handling can include sending an uplink grant from a network device to a user equipment. The method can also include receiving, from the user equipment responsive to the uplink grant, a request to associate a list of logical channel groups. The request to associate can include a request to associate a plurality of logical channels with the logical channel group. The method can further include sending, from the network device to the user equipment, a reconfiguration message confirming the list of logical channel groups and association with plurality of logical channels.

In a further example, a user equipment can include at least one processor and at least one memory including computer instructions. The at least one memory and the computer instructions can be configured to, with the at least one processor, cause the user equipment at least to receive an uplink grant at the user equipment from a network device. The at least one memory and the computer instructions can also be configured to, with the at least one processor, cause the user equipment at least to associate the uplink grant directly with a logical channel group including a plurality of logical channels.

In yet another example, a network device can include at least one processor and at least one memory including computer instructions. The at least one memory and the computer instructions can be configured to, with the at least one processor, cause the network device at least to send an uplink grant from the network device to a user equipment. The at least one memory and the computer instructions can also be configured to, with the at least one processor, cause the network device at least to receive, from the user equipment responsive to the uplink grant, a request to associate a list of logical channel groups. The request to associate can include a request to associate a plurality of logical channels with the logical channel group. The at least one memory and the computer instructions can further be configured to, with the at least one processor, cause the network device at least to send, from the network device to the user equipment, a reconfiguration message confirming the list of logical channel groups and association with the plurality of logical channels.

In an additional example, a non-transitory computer-readable medium can be encoded with instructions that, when executed in a user equipment, perform a process for uplink grant handling. The process can include receiving an uplink grant at the user equipment from a network device. The process can also include associating the uplink grant directly with a logical channel group including a plurality of logical channels.

In a further example, a non-transitory computer-readable medium can be encoded with instructions that, when executed in a network device, perform a process for uplink grant handling. The process can include sending an uplink grant from the network device to a user equipment. The process can also include receiving, from the user equipment responsive to the uplink grant, a request to associate a list of logical channel groups. The request to associate can include a request to associate a plurality of logical channels with the logical channel group. The process can further include sending, from the network device to the user equipment, a reconfiguration message confirming the list of logical channel groups and association with the plurality of logical channels.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Figure 1A:
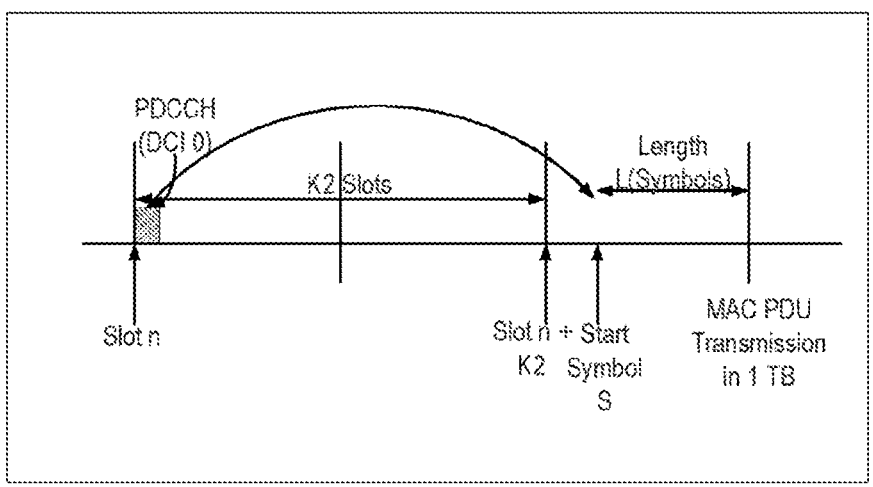
FIGS. 1A, 1B, and 1C illustrate typical scenarios for scheduled uplink transmission.

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various aspects of wireless communication systems will now be described with reference to various apparatus and methods. These apparatus and methods will be described in the following detailed description and illustrated in the accompanying drawings by various blocks, modules, units, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

The techniques described herein may be used for various wireless communication networks, such as code division multiple access (CDMA) system, time division multiple access (TDMA) system, frequency division multiple access (FDMA) system, orthogonal frequency division multiple access (OFDMA) system, single-carrier frequency division multiple access (SC-FDMA) system, and other networks. The terms "network" and "system" are often used interchangeably. A CDMA network may implement a radio access technology (RAT), such as Universal Terrestrial Radio Access (UTRA), CDMA 2000, etc. A TDMA network may implement a RAT, such as Global System for Mobile communication (GSM). An OFDMA network may implement a RAT, such as Long-Term Evolution (LTE) or New Radio (NR). The techniques described herein may be used for the wireless networks and RATs mentioned above, as well as other wireless networks and RATs.

In typical cellular modems, the data plane architecture of the modem may be statically configured for the maximum expected throughput processing, including processors that are not scalable. In some cellular modems, processing units that are specific to one or two layers may be implemented. As such, the processing units may not be proportionally scalable to optimize the power and performance of the modem, to support either high throughput or low latency low throughput applications.

In a fifth-generation (5G) cellular wireless modem, the user equipment (UE) uplink (UL) medium access control (MAC) layer can receive the UL grant resource allocation from the physical downlink control channel (PDCCH) in a downlink control indicator (DCI) at the beginning of a slot. The UL grant resource allocation can inform the UE to transmit an UL MAC protocol data unit (MACPDU) at a time delay equivalent to K2 slots away from the current slot.

Figure 1B:
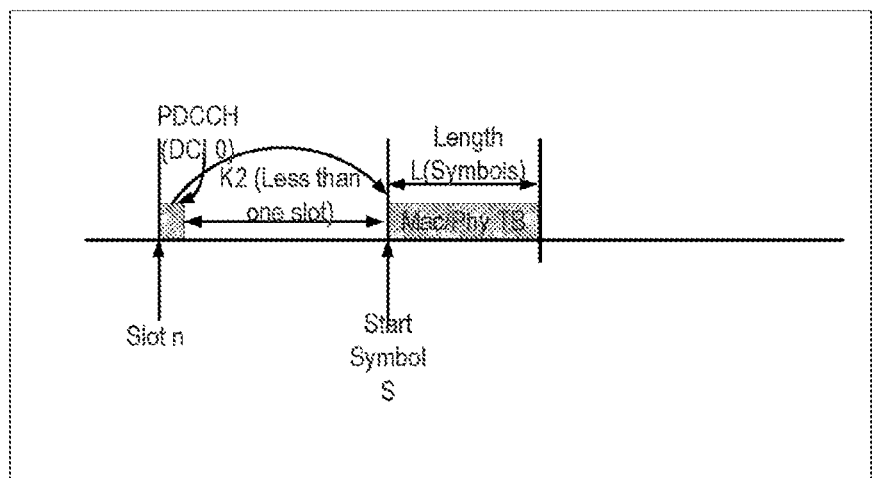
Figure 1C:
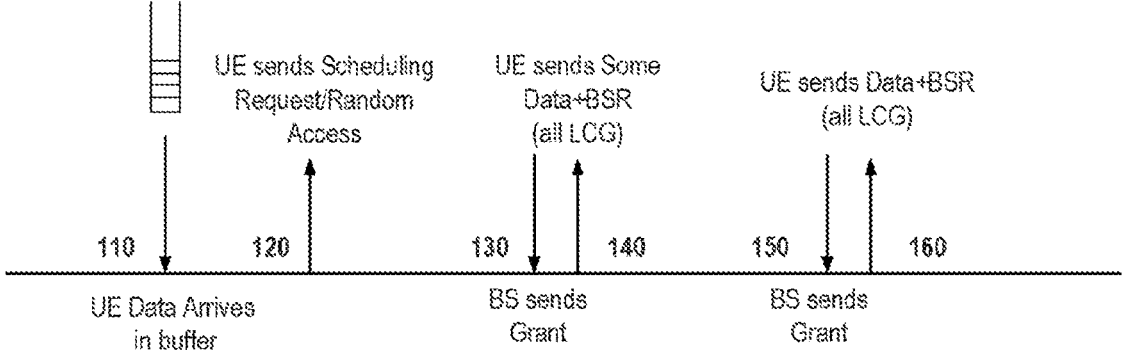

FIGS. 1A, 1B, and 1C illustrate typical scenarios for scheduled uplink transmission. FIG. 1A illustrates scheduled uplink transmission where the scheduled time is one or more slots away. FIG. 1B illustrates scheduled uplink transmission where the scheduled time is less than one slot away. FIG. 1C illustrates data flow to and from the UE in the approaches of FIGS. 1A and 1B.

In FIG. 1, K2 is 1 or more slots away, with a transmission start symbol S from the slot boundary. By contrast, in FIG. 2, K2 is <1 (=0), with a transmission start symbol S that is in the same slot. Typically, K2<1 grants are implied to be serviced for low latency application data. Hence Logical Channels (LC) data are pulled into such grants to be sent out as soon as possible.

More particularly, as shown in FIG. 1A, PDCCH containing DCI 0 can arrive in slot n and indicate that transmission is scheduled at a later time, which is K2 slots later (where K2 is one or greater). The transmission can begin at start symbol S and last L symbols. The transmission can send a MAC PDU in one transport block (TB).

Similarly, as shown in FIG. 1B, PDCCH containing DCI 0 can arrive in slot n and indicate that transmission is scheduled shortly, namely K2 slots later, where K2 is less than one. The transmission can begin at start symbol S and last L symbols. The transmission can send a MAC PDU in one transport block (TB).

As shown in FIG. 1C, at 110 UE data can arrive in a buffer for transmission from the UE. At 120, the UE can send a scheduling request, or the UE can attempt random access. Then, at 130, the BS may send a grant. At 140, in response to the grant, the UE can send some data plus a buffer status report (BSR) for all logical channels (LCs) or logical channel groups (LCGs). Again, at 150, the BS may again send a grant, and the UE may, at 160, send data (in this case, possibly all the available data for transmission) and a BSR for all LCs or LCGs.

An UL MAC scheduling algorithm can apply a logical channel prioritization (LCP) method per the Third-Generation Partnership Project (3GPP) standard. The method can schedule packets from LCs according to allocated grant bytes from a configured maximum bucket size setting. In a UE configuration with carrier aggregation (CA), multiple component carriers (CCs) can be aggregated for transmission. The UE may receive multiple grants concurrently, one from each CC and cell. The UE UL MAC scheduling algorithm can service these multiple grants arriving concurrently, such that the UL data packets are prepared for transmission at the scheduled time slots, where the time delay, K2, may be within the same slot or several slots away.

Upon receipt of an uplink grant, the UL scheduling mechanism in the UE can run logical channel prioritization on all logical channels. For each LC, the UE can check some parameters of the LC, such as allowed sub-carrier spacing (SCS), allowed serving cell list or maximum physical uplink scheduling channel (PUSCH) duration, to determine if the LC packets can be dequeued for this grant. In fact, an LC may be served by multiple grants with different K2 values. The base station may also assign a logical channel grouping of LCs, for the purpose of buffer size reporting to the BS, so that the BS can allocate UL grants for the UE. If there are any pending data for transmission in any LC, the UE may need to include a BSR report of all the LCGs for the TB transmission.

Specifically, there may be no direct correlation of the UE received grant from the BS with latency to transmission, K2, with the LCG buffer sizes reported by the UE. In addition, the UE may be required to include all LCG buffer sizes in each BSR reporting, wasting processing power and million instructions per seconds (MIPS) even though some LCG queues may not be served in this grant and may not have updated buffer sizes.

A challenge in 5G UL UE data grant scheduling is to process with minimum delay and processing MIPS, the logical channel prioritization of all the logical channels that are allowed for transmission in the current multiple grants, which have transmission delay of K2 slots, where K2 may vary from 0 to 32 slots away.

In some approaches, there may be no direct correlation between the UE received grants with latency to transmission of K2, and the LCG buffer sizes reported in BSR. There may be complex UL grant scheduling logic that spans multiple common logical channels. Furthermore, there may be large processing cycles and MIPS when serving UL grants. Additionally, there may be wastage of processing cycles and MIPS when composing BSR MAC control element (CE) packets. Also, there may be extra memory overhead for BSR MAC CEs to report all LCG buffer sizes. Such an approach may also unsynchronized concurrent multiple memory accesses to multiple common logical channels. Further, there may be high UE power usage with unoptimized UL data scheduling.

Some embodiments of the present disclosure, by contrast, provide a method that may optimize processing of the UE uplink data grant scheduling. Some embodiments of the method may correlate the UL grant latency, K2, to the LCG buffer sizes reported in the BSR, such that the grant can lead to immediate processing of packets from the associated LCG without delay.

According to one aspect of some embodiments, there may be an association of UL grant latency to transmission with a logical channel group. A UL grant can be received at a UE, which can schedule a transmission at K2 slots away. This UL grant can be associated by the UE directly with a logical channel grouping of logical channels that can be dequeued directly with priority for transmission scheduling.

According to another aspect of some embodiments, the UE can request that the BS or other network element or device maintain logical channel grouping lists based on the UL applications. For example, the UE can request the BS to assign a logical channel grouping of logical channels, which can enqueue UL data applications at the UE. Each LCG can be tagged with a latency value, K2.

According to a further aspect of some embodiments, the UE can report the buffer status of the LCG scheduled for each grant, rather than providing all LCG buffer statuses. Thus, the UE may only send the BSR of the LCG in the grant, namely the LCG that is associated with the grant's latency value, K2, and not the entire list of LCG. In case of no UL resources, all LCGs can still be reported in the BSR.

Figure 2:
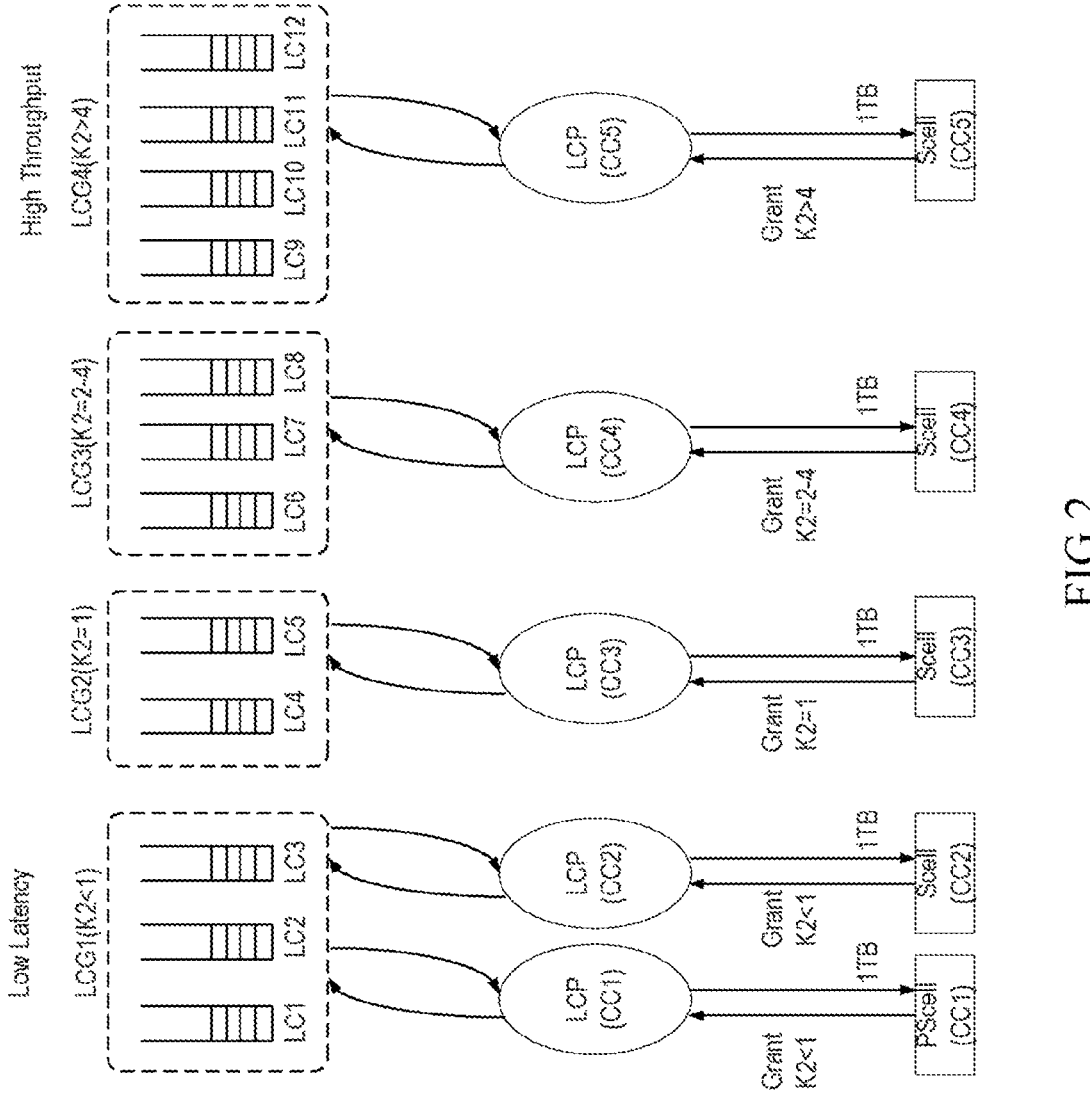
FIG. 2 illustrates an association of UL grant latency to transmission with a logical channel group, according to some embodiments of the present disclosure.

FIG. 2 illustrates an association of UL grant latency to transmission with a logical channel group, according to some embodiments of the present disclosure. As mentioned above, an uplink grant can be received at the UE indicating that the UE is scheduled for a transmission at K2 slots away. The received UL grant can be associated directly with a logical channel grouping of logical channels that can be dequeued directly with priority for transmission scheduling.

FIG. 2 shows how four LCGs can be configured: LCG1 corresponds to K2<1, LCG2 corresponds to K2=1, LCG3 corresponds to K2=2-4, and LCG4 corresponds to K2>4. In this case, LCG1 includes three LCs, namely LC1, LC2, and LC3. LCG2 includes LC4 and LC5. LCG3 includes LC6, LC7, and LC8. Finally, LCG4 includes LC9, LC10, LC11, and LC12.

LCG1 is associated with low latency, while LCG4 is associated with a higher latency but also with a high throughput. As shown, each grant can be associated with an LCG. For example, the two grants at the left of FIG. 2, with a value of K2<1 are associated with LCG1, while each of the other grants have a one-to-one association with a corresponding LCG.

There can be a logical channel prioritization associated with each grant/component carrier. The logical channel prioritization can be applied to an LCG. Primary cell of a secondary cell group (PSCell) and each other secondary cell (Scell) can have its own grant.

Each LCG can be associated with a corresponding latency, K2, such that when the UE receives an uplink grant with a specific K2 value, the LCP function can directly process the associated LCG and dequeue packets from these logical channels, separate from other LCGs. This may prevent multiple LCP access to common LC queues at one time, thus preventing unsynchronous memory access. There may be no performance degradation or ambiguity in the inclusion of data for a specific grant. Each LCG can include several logical channels with queue data, which can only be transmitted in a grant specified for its latency requirements.

Grants for which LCP is performed can be received from each cell in a multiple component carriers configuration. Hence it is possible that multiple LCP grants with the same K2 value may process the same LCG queues, as shown in FIG. 2 with LCG1, which can be accessed by a grant with K2<1, which may come from two different cells.

In the example given, LCG1 can be set up for low latency applications and may be serviced by grants with K2<1. At the other extreme, LCG4 can correspond to LCs hosting high throughput and high latency applications, and which can be served by grants with large K2 value for several slots away for transmission.

Using this scheme, LCG1 can be served with the highest priority with the strictest latency to transmission, with LCG2 at the next highest priority, followed by LCG3, and lastly LCG4 with the lowest priority because it has the largest latency to transmission time. Thus, the user equipment can avoid having high priority low latency packets being nonoptimally included in the medium to high latency queues, which may have delayed transmission time, and deteriorate overall system performance.

Figure 3:
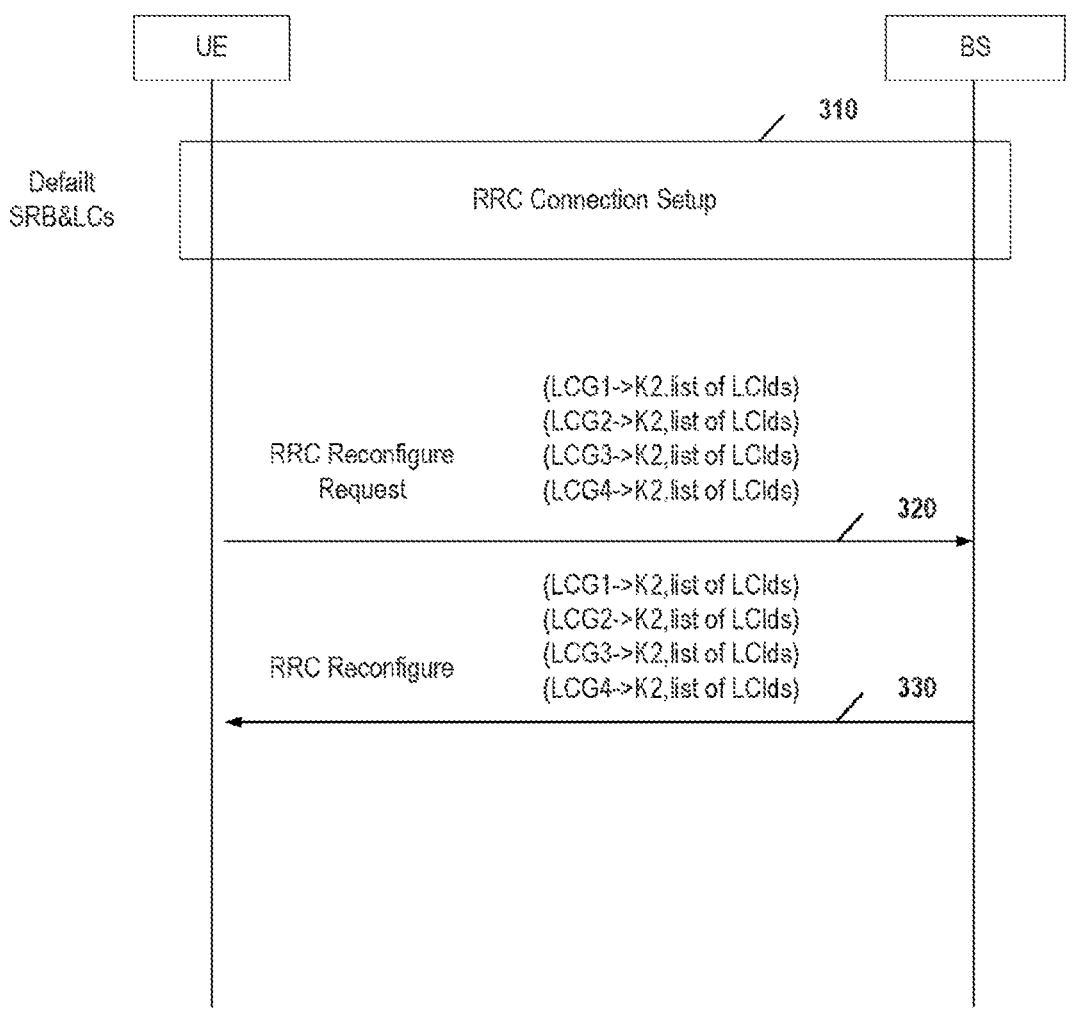
FIG. 3 illustrates a user equipment requesting logical channel grouping lists based on uplink applications, according to some embodiments.

FIG. 3 illustrates a user equipment requesting logical channel grouping lists based on uplink applications, according to some embodiments. As shown in FIG. 3, after radio resource control connection setup of signaling radio bearer (SRB) and logical channels at 310, the UE can send a radio resource control (RRC) reconfiguration request at 320. The request can include a mapping between logical channel groups and a list of logical channels. The logical channels can be identified by logical channel identifiers (LCIds). The list can include a single logical channel or more than one logical channel. Each LCG can be tagged with a latency value K2.

The UE can request the network device, for example, a base station (BS), to assign the logical channel grouping of logical channels that enqueue UL data applications at the UE. For example, the grouping can be based on an intended application known to the UE. It is not necessary to let the BS or other network device know about the intended application.

At 330, the network device, for example, the BS, can reply with an RRC reconfigure message mirroring the lists provided in the RRC reconfigure request message.

Thus, with some embodiments of the present disclosure, the UE can determine the grouping of logical channels and propose an LCG list, each LCG corresponding to a K2 latency value according to its UL UE application needs. As shown in FIG. 3, the UE sends the RRC Reconfigure Request at 320 (after RRC connection setup with default LCIds at 330) to propose this list: RRC Reconfigure Request: (LCG1→K2, list of LCIds); (LCG2→K2, list of LCIds); (LCG3→K2, list of LCIds); and (LCG4→K2, list of LCIds). At 330, the BS can acknowledge this request, and send back the RRC Reconfigure message, mirroring the LCG list proposed.

Figure 4:
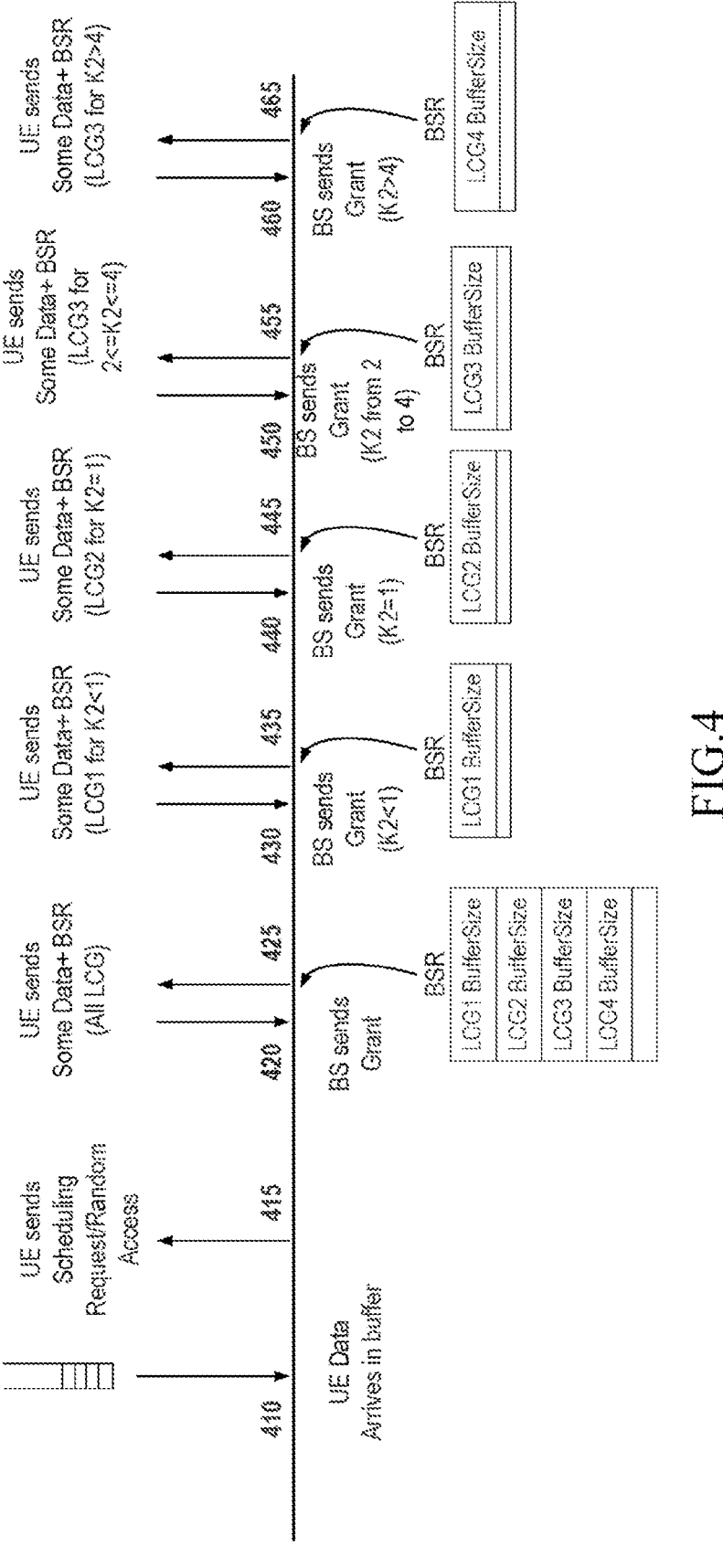
FIG. 4 illustrates user equipment reporting buffer status reports of a logic channel group schedule for each grant, according to some embodiments of the present disclosure.

FIG. 4 illustrates user equipment reporting buffer status reports of a logic channel group schedule for each grant, according to some embodiments of the present disclosure. As shown in FIG. 4, at 410 UE data can arrive in a buffer, for example, from an application or host in the UE. At 415, the UE can send a scheduling request or can attempt random access.

The UE may only send a BSR of the LCG that is associated with the grant's latency value K2, and not the entire list of LCGs. In case there are no UL resources, all LCGs can still be reported in the BSR. The case where there are no UL resources is not shown in FIG. 4.

As shown in FIG. 4, however, once UE data arrives in a LC buffer at 410 and there is not already an UL resource allocation, the UE can send a scheduling request at 415. If no physical uplink control channel (PUCCH) resources are present, the UE can trigger random access procedures at 415. The BS can then assign some minimal UL grant resources either in the physical downlink control channel (PDCCH) downlink control indicator (DCI) message, or in the random access response message. This grant is shown at 420.

With the resources provided by the UL grant, at 425 the UE can send the LCG buffer sizes in the formatted BSR reports to the BS, to request further UL grant resources corresponding to each LCG. In this initial BSR, all the buffer sizes for all the LCG can be included. The BS can then associate the BSR reports for each LCG buffer size with an assigned UL grant resource with the associated K2 latency value that was set up earlier.

For the LCG1 with K2<1, the UL grant can be sent at 430 by the BS with the highest priority. Once the UE receives this UL grant, the UE can perform LCP to dequeue the high priority packets from the associated Logical Channels from this LCG1 only, and then at 435 can include a succinct BSR with only this LCG1's buffer size to request for more UL resources if needed.

Following this, at 440 the BS can send the next higher priority grant for LCG2 with K2=1, with the allocated grant resource corresponding to the BSR buffer size reported for this LCG2 of K2=1. Thus, at 445, the UE includes a small BSR with only this LCG's buffer size to be reported to the BS, so that the BS can continue to allocate UL resources for this LCG.

Finally, at 450 the BS can send the grant for the LCG3 with K2 in the range of 2 to 4, and at 460 can send the highest latency grant for LCG4 with K2>4. As in the other previous 2 UL transmissions, at 455 and 465 the UE respectively can include only the BSR buffer sizes for the LCG associated with the corresponding grant's K2 value.

In summary, some embodiments of the present disclosure can correlate a UL grant latency K2 directly to the LCG buffer sizes reported in the BSR by the UE, such that the BS can allocate the required grant size for each LCG grouping of logical channels with the specific latency value, thereby optimizing the UL transmission resources. At the UE, the grant can lead to immediate processing of packets from the associated LCG without delay.

Figure 5:
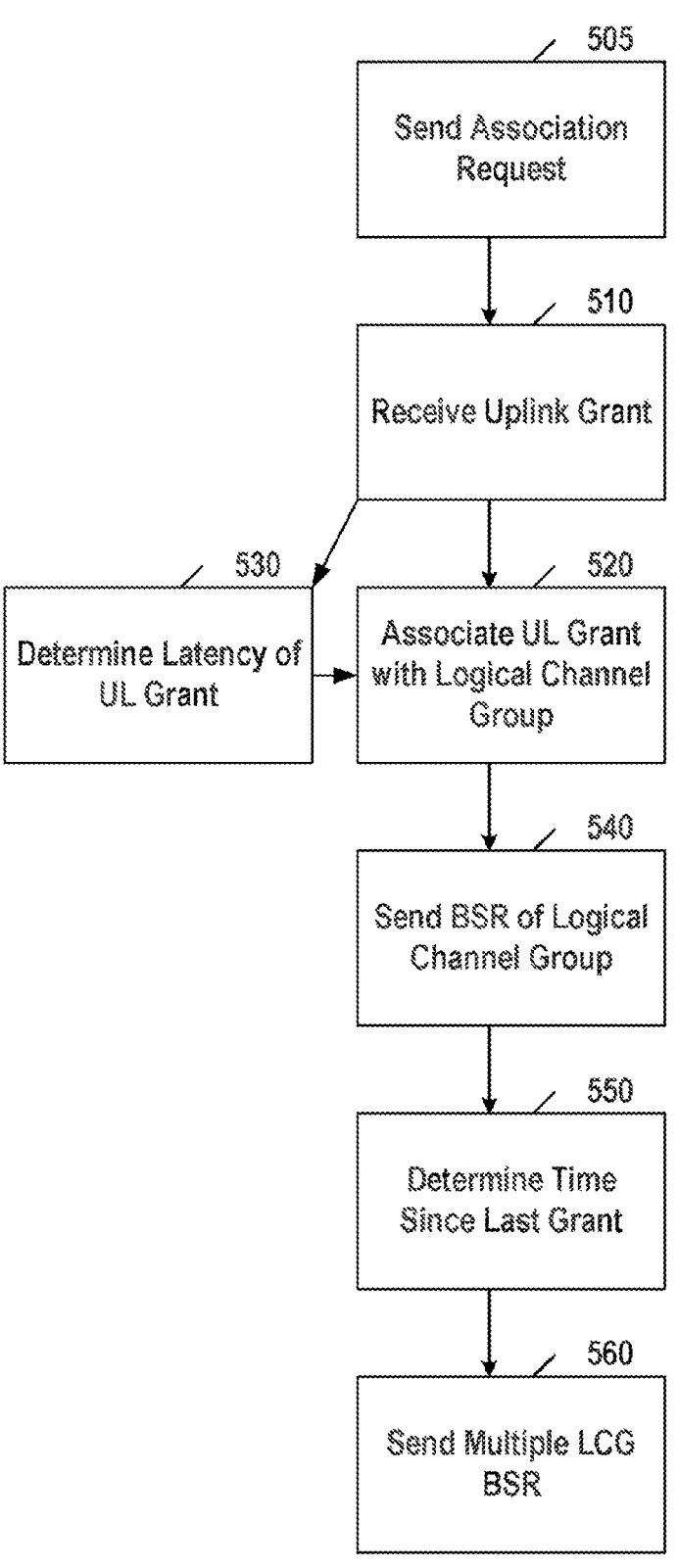
FIG. 5 illustrates a user equipment method, according to some embodiments of the present disclosure.

FIG. 5 illustrates a user equipment method, according to some embodiments of the present disclosure. The method can include, at 510, receiving an uplink grant at a user equipment from a network device. The method can also include, at 520, associating the uplink grant directly with a logical channel group comprising a plurality of logical channels. The logical channel group can be dequeued directly with priority for transmission scheduling. For example, the associating can be performed based on a mapping between latency of the uplink grant and a logical channel group. The latency of the uplink grant can refer to the time between when the uplink grant is provided to the user equipment and the scheduled transmission mentioned in the uplink grant.

The network device can be a base station, as illustrated in the preceding examples. Other examples of network devices can include other access nodes, broadly including evolved Node Bs (eNBs) next generation Node Bs (gNBs), or the like.

The method can also include, at 505, sending, to the network device from the user equipment, a request to associate a list of logical channel groups comprising the logical channel group. The request to associate can include a request to associate the plurality of logical channels with the logical channel group. Not shown in this example, the base station can receive the request and reply confirming that the association is being made as requested.

The request to associate can further include a request to associate a latency with the logical channel group. For example, the logical channel group may be associated with K2<1, K2=1, or the like.

The method can additionally include, at 530, determining, by the user equipment, a latency of the uplink grant. This may be performed by determining the time between when the uplink grant is received and when the transmission is scheduled. The method can further include, at 540, sending, to the network device responsive to the uplink grant, a buffer status report only of all logical channel groups associated with the latency. The latency can be a latency value (for example, $K2=1$), or a latency range (for example, $2<=K2<=4$).

The method can further include, at 550, determining, by the user equipment, that a time since a last uplink grant for a plurality of logical channel groups exceeds a threshold. For example, if many slots pass without receiving any uplink grants for $K2=4$, the user equipment may decide that the network device needs to be aware that the user equipment has data suitable for such latency of communication. In some cases, in addition to using a timer and threshold, the user equipment may determine whether the logical channel group(s) have any data to be transmitted. When the timer has expired (and/or other criteria are met), the method can also include, at 560, sending, to the network device, a buffer status report of the plurality of logical channel groups.

Figure 6:
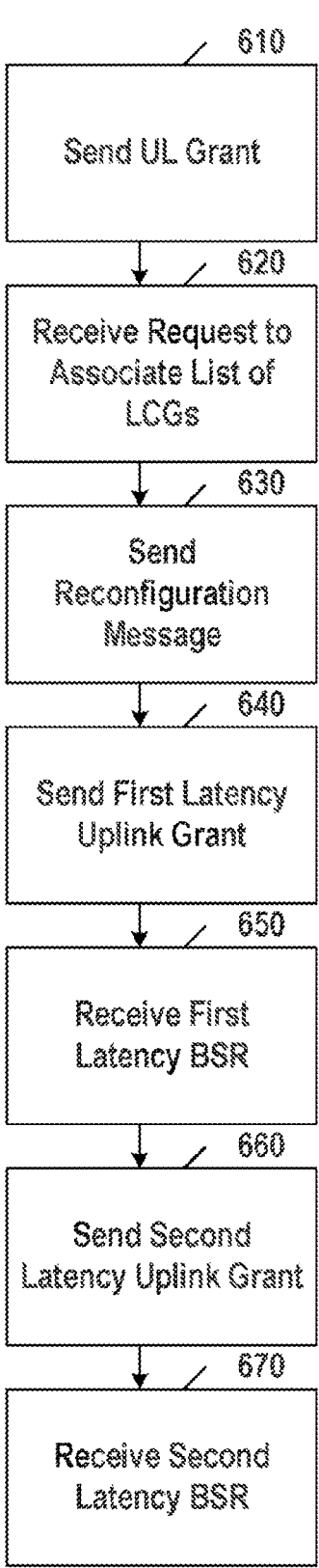
FIG. 6 illustrates a network device method, according to some embodiments of the present disclosure.

FIG. 6 illustrates a network device method, according to some embodiments of the present disclosure. The method can include, at 610, sending an uplink grant from a network device to a user equipment. This may the same uplink grant received at 510 in FIG. 5. Thus, the methods of FIGS. 5 and 6 may be performed together with one another. For example, the method of FIG. 5 may be performed by a user equipment, while the method of FIG. 6 may be performed by one or more network device, such as a base station.

As shown in FIG. 6, at 620, the method can include receiving, from the user equipment responsive to the uplink grant, a request to associate a list of logical channel groups. The request to associate can include a request to associate a plurality of logical channels with the logical channel group. The method can further include, at 630, sending, from the network device to the user equipment, a reconfiguration message confirming the list of logical channel groups and association with the plurality of logical channels. For example, an RRC reconfigure message can be sent from a base station to a user equipment, as illustrated in FIG. 3.

As shown in FIG. 6, the method can also include, at 640, sending, from the network device to the user equipment, a first latency uplink grant corresponding to a first logical channel group associated with a first latency. The method can further include, at 650, receiving, from the user equipment responsive to the first uplink grant, a buffer status report from the user equipment. The list of logical channel groups can include the first logical channel group.

The method can additionally include, at 660, sending, from the network device to the user equipment, a second latency uplink grant corresponding to a second logical channel group associated with a second latency. The second latency uplink grant can be sent with respect to a different component carrier or cell or the same cell at a different time. The method can also include, at 670, receiving, from the user equipment responsive to the second uplink grant, a buffer status report from the user equipment. The list of logical channel groups can include the second logical channel group. The second latency can be different from the first latency, and the second logical channel group can be different from the first logical channel group. The first logical channel group can be indicated in the first uplink grant implicitly by indicating the first latency explicitly. The same approach can be used for the second logical channel group, and so on.

Some embodiments provide a simple, practical scheme that can be implemented in software, or alternatively in hardware or some combination thereof. Some embodiments may also provide optimized UL grant processing for each UL application data category identified by the UE. Processing cycles and MIPS savings can be provided by some embodiments when servicing UL grants with targeted LCG, based on K2 delay, and when composing BSR MAC control elements. There may also be memory savings for reduced BSR MAC control element sending. Some embodiments can eliminate inefficient LCP dequeuing of overlapping multiple LCs in one grant. Furthermore, some embodiments can prevent unsynchronized memory access of multiple common LCs. Separate LCGs in some embodiments may prevent excessive numbers of memory accesses of common logical channels queues during LCP. In addition, some embodiments may provide improved UE power with optimized UL data scheduling.

In some embodiments, variations on the above examples can be implemented. For example, while the illustrations in FIGS. 2, 3, and 4 show four categories of latency values, K2, there may be other numbers of categories, such as separate categories for each of 2, 3, and 4, or only three categories of, for example, $K2<1$, $K2=1$, and $K2>1$. Additionally, there may be a timer such that if no grants for at least one of the LCGs is received by the expiration of the timer, two or more LCGs (including the one for which no grant was received) can be reported in a buffer status report together.

Figure 7:
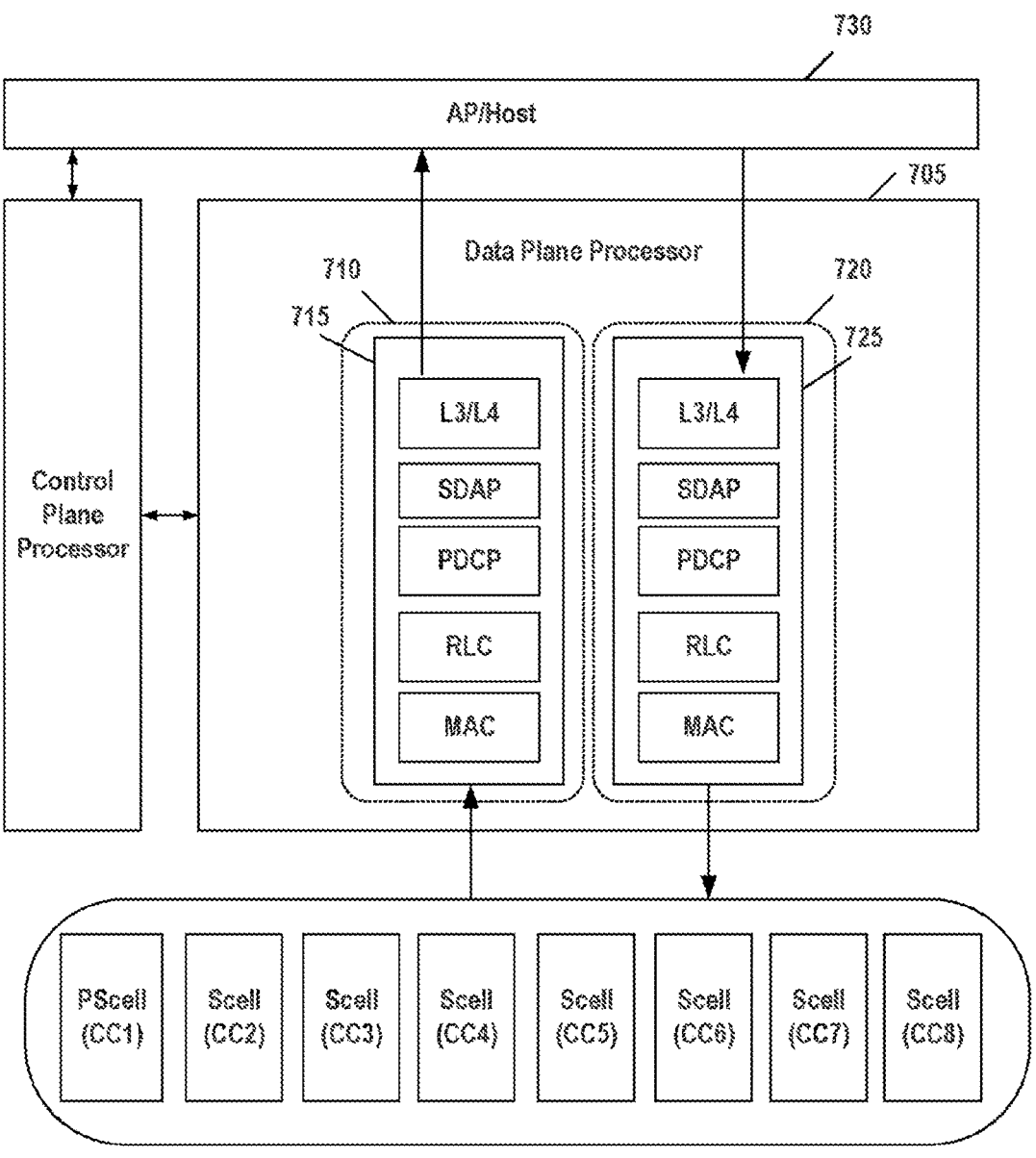
FIG. 7 illustrates a fifth-generation (5G) data plane architecture.

FIG. 7 illustrates a 5G data plane architecture. As shown in FIG. 7, in a 5G cellular wireless modem, the UE data stack can include layer two (L2) layers of medium access control (MAC), radio link control (RLC), packet data convergence protocol (PDCP), and service data adaptation protocol (SDAP), and L3/L4 layers. The UE data stack can process the internet protocol (IP) layer functions.

FIG. 7 illustrates a typical structure of data stack processing architecture for a 5G cellular wireless modem. Separate vertical processing stacks, a downlink (DL) processing engine 710 and an uplink (UL) processing engine 720, are usually put together in one processing engine, in this example data plane processor 705, for the DL data stack and UL data stack, which could be one processor core or separate cores for each layer. In FIG. 7, a single DL core 715 and a single UL core 725 are illustrated by way of example.

Within the protocol stacks (whether considering the DL data stack or the UL data stack), the MAC layer can interface with the physical (PHY) layer to transfer DL and UL data, and the L3/L4 layer can interface with the AP/Host 730. Packet data can be transferred from shared memory (not shown) throughout the data stack, which could be local or external memory.

In a typical 5G carrier aggregation (CA) configuration, multiple component carriers can be aggregated for a MAC entity, and the data stack can process multiple Transport Blocks (TBs), one from each CC, in one time slot. This can be processed for time slot durations from 1ms (which implies 15 kHz subcarrier spacing (SCS)), 0.5 ms (which implies 30 kHz SCS), 0.25 ms (which implies 60 kHz SCS), and up to 0.125 ms (which implies 120 kHz SCS).

At the DL, the MAC layer can decode and route TBs from each CC to logical channels up the data stack processing chain. The DL data stack can include packet processing and radio link recovery mechanisms at RLC, PDCP, SDAP, and L3/L4 layers.

At the UL, arriving data packets from AP/Host 730 can be processed by L3/L4, PDCP, RLC layers and put into LC queues. Upon grant arrival from each CC, the MAC layer can multiplex the data to be sent out for each TB on each CC.

As shown in FIG. 7, there can be multiple CCs. For example, one component carrier (in this example, CC1) can be for a primary cell of a secondary cell group (SCG). The remaining component carriers may be for other cells of the SCG. It may be valuable for the data stack to process multiple TBs from multiple CC efficiently and effectively for all traffic loads.

Figure 9:
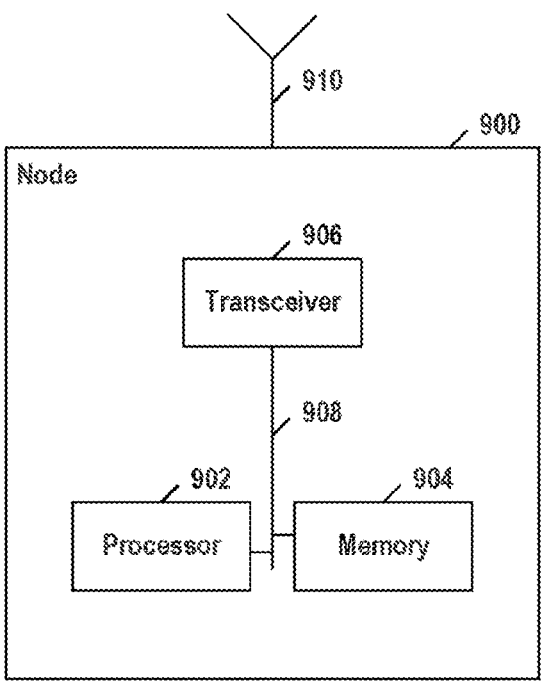
FIG. 9 illustrates an example node, in which some aspects of the present disclosure may be implemented, according to some embodiments of the present disclosure.
Figure 10:
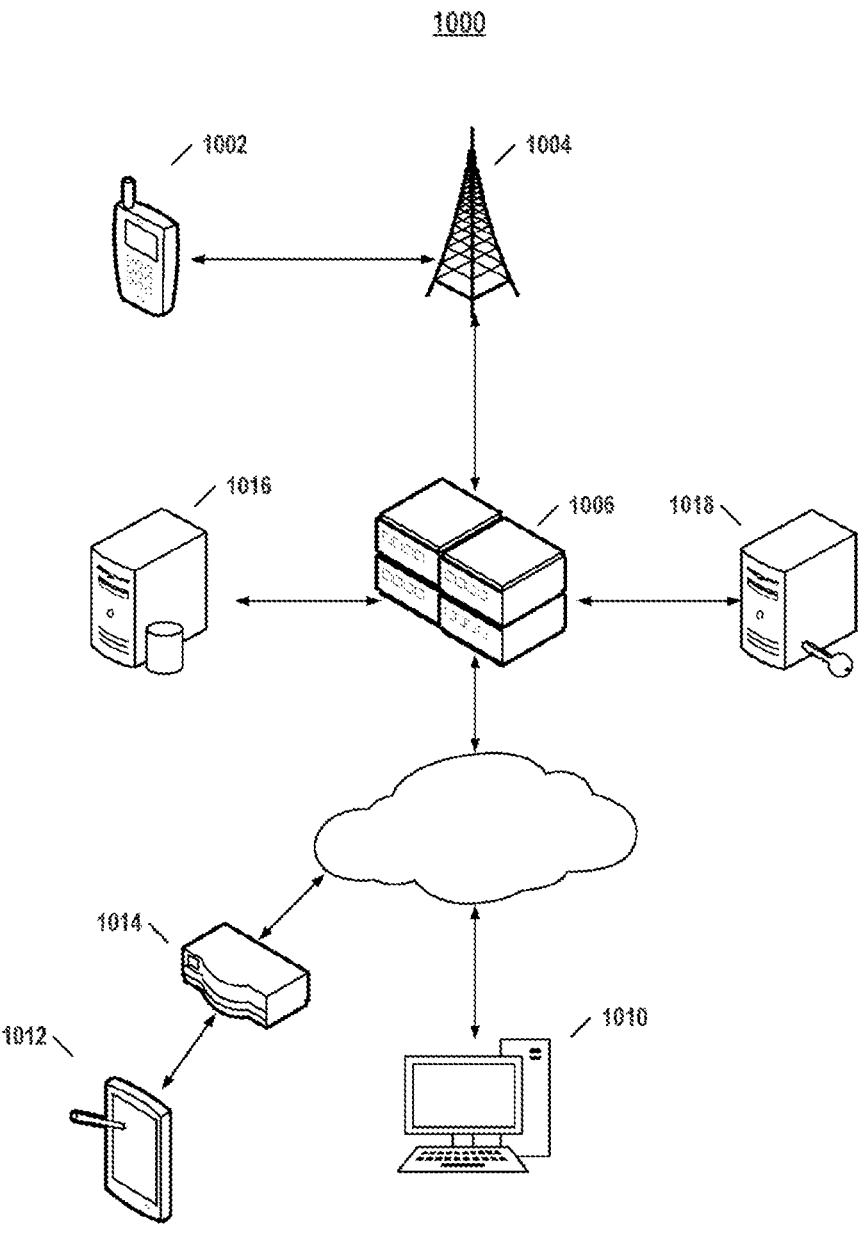
FIG. 10 illustrates an example wireless network, in which some aspects of the present disclosure may be implemented, according to some embodiments of the present disclosure.

The software and hardware methods and systems disclosed herein, such as the system of FIG. 7 or the methods illustrated in FIGS. 2 through 6 may be implemented by any suitable nodes in a wireless network. For example, FIGS. 8 and 9 illustrate respective apparatuses 800 and 900, and FIG. 10 illustrates an exemplary wireless network 1000, in which some aspects of the present disclosure may be implemented, according to some embodiments of the present disclosure.

Figure 8:
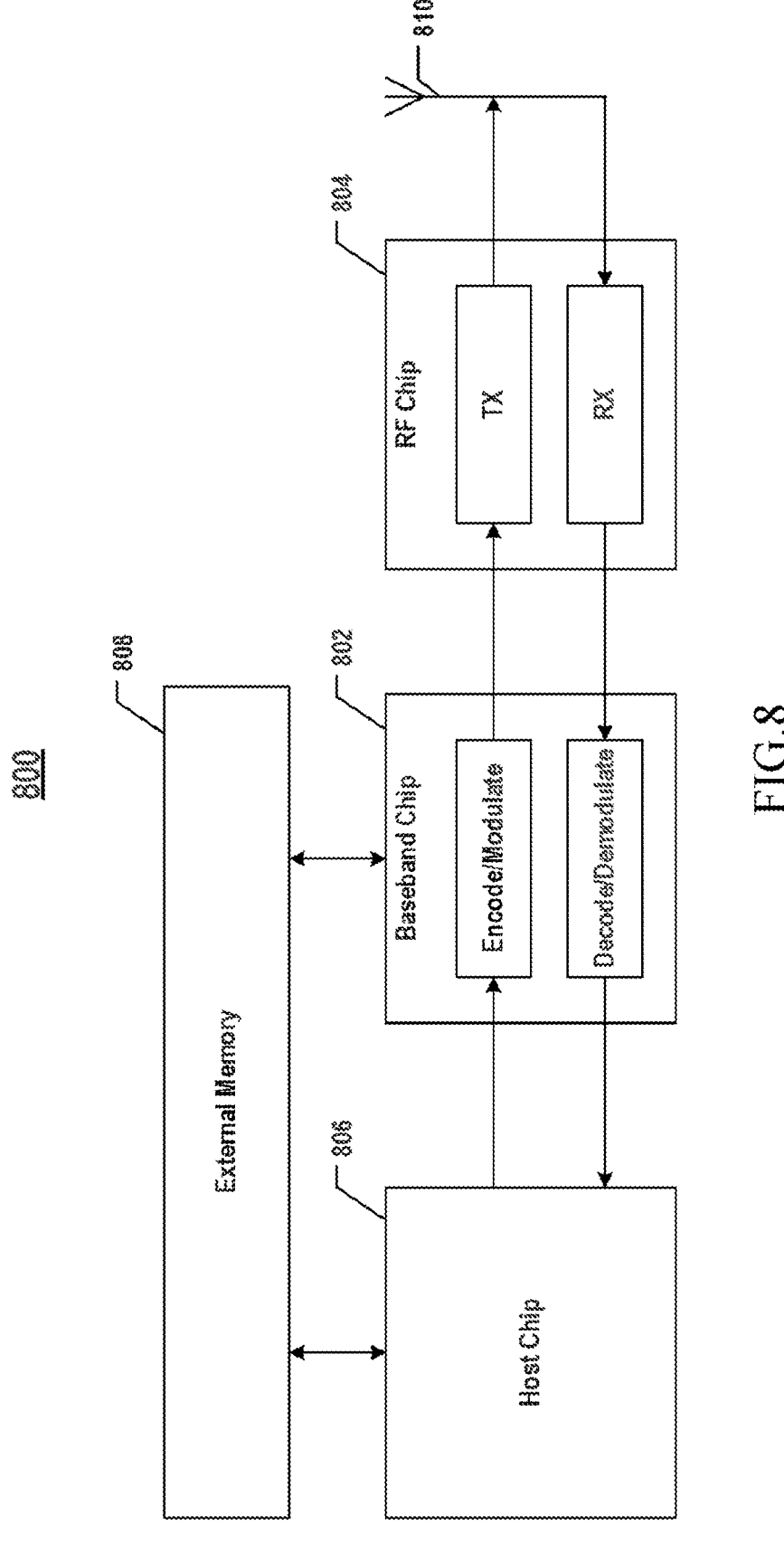
FIG. 8 illustrates a block diagram of an apparatus including a baseband chip, a radio frequency chip, and a host chip, according to some embodiments of the present disclosure.

FIG. 8 illustrates a block diagram of an apparatus 800 including a baseband chip 802, a radio frequency chip 804, and a host chip 806, according to some embodiments of the present disclosure. Apparatus 800 may be an example of any suitable node of wireless network 1000 in FIG. 10, such as user equipment 1002 or network node 1004. As shown in FIG. 8, apparatus 800 may include baseband chip 802, radio frequency chip 804, host chip 806, and one or more antennas 810. In some embodiments, baseband chip 802 is implemented by processor 902 and memory 904, and radio frequency chip 804 is implemented by processor 902, memory 904, and transceiver 906, as described below with respect to FIG. 9. In some embodiments, baseband chip 802 may, in whole or in part, implement the systems and methods and generate and process the messages shown in FIGS. 2-7. For example, baseband chip 802 in a user equipment may perform the UE steps, generate the UE messages, and the like, respectively, in the uplink and downlink. Besides the on-chip memory (also known as "internal memory" or "local memory," e.g., registers, buffers, or caches) on each chip 802, 804, or 806, apparatus 800 may further include an external memory 808 (e.g., the system memory or main memory) that can be shared by each chip 802, 804, or 806 through the system/main bus. Although baseband chip 802 is illustrated as a standalone SoC in FIG. 8, it is understood that in one example, baseband chip 802 and radio frequency chip 804 may be integrated as one SoC; in another example, baseband chip 802 and host chip 806 may be integrated as one SoC; in still another example, baseband chip 802, radio frequency chip 804, and host chip 806 may be integrated as one SoC, as described above.

In the uplink, host chip 806 may generate raw data and send it to baseband chip 802 for encoding, modulation, and mapping. As mentioned above, the data from host chip 806 may be associated with various IP flows. Baseband chip 802 may map those IP flows to quality of service flows and perform additional data plane management functions. Baseband chip 802 may also access the raw data generated by host chip 806 and stored in external memory 808, for example, using the direct memory access (DMA). Baseband chip 802 may first encode (e.g., by source coding and/or channel coding) the raw data and modulate the coded data using any suitable modulation techniques, such as multiphase pre-shared key (MPSK) modulation or quadrature amplitude modulation (QAM). Baseband chip 802 may perform any other functions, such as symbol or layer mapping, to convert the raw data into a signal that can be used to modulate the carrier frequency for transmission. In the uplink, baseband chip 802 may send the modulated signal to radio frequency chip 804. Radio frequency chip 804, through the transmitter (Tx), may convert the modulated signal in the digital form into analog signals, i.e., radio frequency signals, and perform any suitable front-end radio frequency functions, such as filtering, up-conversion, or sample-rate conversion. Antenna 810 (e.g., an antenna array)

may transmit the radio frequency signals provided by the transmitter of radio frequency chip 804.

In the downlink, antenna 810 may receive radio frequency signals and pass the radio frequency signals to the receiver (Rx) of radio frequency chip 804. Radio frequency chip 804 may perform any suitable front-end radio frequency functions, such as filtering, down-conversion, or sample-rate conversion, and convert the radio frequency signals into low-frequency digital signals (baseband signals) that can be processed by baseband chip 802. In the downlink, baseband chip 802 may demodulate and decode the baseband signals to extract raw data that can be processed by host chip 806. Baseband chip 802 may perform additional functions, such as error checking, de-mapping, channel estimation, descrambling, etc. The raw data provided by baseband chip 802 may be sent to host chip 806 directly or stored in external memory 808.

As shown in FIG. 9, a node 900 may include a processor 902, a memory 904, a transceiver 906. These components are shown as connected to one another by bus 908, but other connection types are also permitted. When node 900 is user equipment 1002, additional components may also be included, such as a user interface (UI), sensors, and the like. Similarly, node 900 may be implemented as a blade in a server system when node 900 is configured as core network element 1006. Other implementations are also possible.

Transceiver 906 may include any suitable device for sending and/or receiving data. Node 900 may include one or more transceivers, although only one transceiver 906 is shown for simplicity of illustration. An antenna 910 is shown as a possible communication mechanism for node 900. Multiple antennas and/or arrays of antennas may be utilized. Additionally, examples of node 900 may communicate using wired techniques rather than (or in addition to) wireless techniques. For example, network node 1004 may communicate wirelessly to user equipment 1002 and may communicate by a wired connection (for example, by optical or coaxial cable) to core network element 1006. Other communication hardware, such as a network interface card (NIC), may be included as well.

As shown in FIG. 9, node 900 may include processor 902. Although only one processor is shown, it is understood that multiple processors can be included. Processor 902 may include microprocessors, microcontrollers, digital signal processors (DSPs), application-specific integrated circuits (ASICs), field-programmable gate arrays (FPGAs), programmable logic devices (PLDs), state machines, gated logic, discrete hardware circuits, and other suitable hardware configured to perform the various functions described throughout the present disclosure. Processor 902 may be a hardware device having one or many processing cores. Processor 902 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code. Other techniques for instructing hardware are also permitted under the broad category of software. Processor 902 may be a baseband chip, such as baseband chip 802 in FIG. 8. Node 900 may also include other processors, not shown, such as a central processing unit of the device, a graphics processor, or the like. Processor 902 may include internal memory (also known as local memory, not shown in FIG. 9) that may serve as memory for L2 data. Processor 902 may include a radio frequency chip, for example, integrated into a baseband chip, or a radio frequency chip may be provided separately. Processor 902 may be configured to operate as a modem of node 900, or may be one element or component of a modem. Other arrangements and configurations are also permitted.

As shown in FIG. 9, node 900 may also include memory 904. Although only one memory is shown, it is understood that multiple memories can be included. Memory 904 can broadly include both memory and storage. For example, memory 904 may include random-access memory (RAM), read-only memory (ROM), static RAM (SRAM), dynamic RAM (DRAM), ferro-electric RAM (FRAM), electrically erasable programmable ROM (EEPROM), CD-ROM or other optical disk storage, hard disk drive (HDD), such as magnetic disk storage or other magnetic storage devices, Flash drive, solid-state drive (SSD), or any other medium that can be used to carry or store desired program code in the form of instructions that can be accessed and executed by processor 902. Broadly, memory 904 may be embodied by any computer-readable medium, such as a non-transitory computer-readable medium. The memory 904 can be the external memory 808 in FIG. 8. The memory 904 may be shared by processor 902 and other components of node 900, such as the unillustrated graphic processor or central processing unit.

As shown in FIG. 10, wireless network 1000 may include a network of nodes, such as a UE 1002, a network node 1004, and a core network element 1006. User equipment 1002 may be any terminal device, such as a mobile phone, a desktop computer, a laptop computer, a tablet, a vehicle computer, a gaming console, a printer, a positioning device, a wearable electronic device, a smart sensor, or any other device capable of receiving, processing, and transmitting information, such as any member of a vehicle to everything (V2X) network, a cluster network, a smart grid node, or an Internet-of-Things (IoT) node. It is understood that user equipment 1002 is illustrated as a mobile phone simply by way of illustration and not by way of limitation.

Network node 1004 may be a device that communicates with user equipment 1002, such as a wireless access point, a base station (BS), a Node B, an enhanced Node B (eNodeB or eNB), a next-generation NodeB (gNodeB or gNB), a cluster master node, or the like. Network node 1004 may have a wired connection to user equipment 1002, a wireless connection to user equipment 1002, or any combination thereof. Network node 1004 may be connected to user equipment 1002 by multiple connections, and user equipment 1002 may be connected to other access nodes in addition to network node 1004. Network node 1004 may also be connected to other UEs. It is understood that network node 1004 is illustrated by a radio tower by way of illustration and not by way of limitation.

Core network element 1006 may serve network node 1004 and user equipment 1002 to provide core network services. Examples of core network element 1006 may include a home subscriber server (HSS), a mobility management entity (MME), a serving gateway (SGW), or a packet data network gateway (PGW). These are examples of core network elements of an evolved packet core (EPC) system, which is a core network for the LTE system. Other core network elements may be used in LTE and in other communication systems. In some embodiments, core network element 1006 includes an access and mobility management function (AMF) device, a session management function (SMF) device, or a user plane function (UPF)

device, of a core network for the NR system. It is understood that core network element 1006 is shown as a set of rack-mounted servers by way of illustration and not by way of limitation.

Core network element 1006 may connect with a large network, such as the Internet 1008, or another IP network, to communicate packet data over any distance. In this way, data from user equipment 1002 may be communicated to other UEs connected to other access points, including, for example, a computer 1010 connected to Internet 1008, for example, using a wired connection or a wireless connection, or to a tablet 1012 wirelessly connected to Internet 1008 via a router 1014. Thus, computer 1010 and tablet 1012 provide additional examples of possible UEs, and router 1014 provides an example of another possible access node.

A generic example of a rack-mounted server is provided as an illustration of core network element 1006. However, there may be multiple elements in the core network including database servers, such as a database 1016, and security and authentication servers, such as an authentication server 1018. Database 1016 may, for example, manage data related to user subscription to network services. A home location register (HLR) is an example of a standardized database of subscriber information for a cellular network. Likewise, authentication server 1018 may handle authentication of users, sessions, and so on. In the NR system, an authentication server function (AUSF) device may be the specific entity to perform user equipment authentication. In some embodiments, a single server rack may handle multiple such functions, such that the connections between core network element 1006, authentication server 1018, and database 1016, may be local connections within a single rack.

Each of the elements of FIG. 10 may be considered a node of wireless network 1000. More detail regarding the possible implementation of a node is provided by way of example in the description of a node 900 in FIG. 9 above. Node 900 may be configured as user equipment 1002, network node 1004, or core network element 1006 in FIG. 10. Similarly, node 900 may also be configured as computer 1010, router 1014, tablet 1012, database 1016, or authentication server 1018 in FIG. 10.

In various aspects of the present disclosure, the functions described herein may be implemented in hardware, software, firmware, or any combination thereof. If implemented in software, the functions may be stored on or encoded as instructions or code on a non-transitory computer-readable medium. Computer-readable media includes computer storage media. Storage media may be any available media that can be accessed by a computing device, such as node 900 in FIG. 9. By way of example, and not limitation, such computer-readable media can include RAM, ROM, EEPROM, CD-ROM or other optical disk storage, HDD, such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, digital versatile disk (DVD), and floppy disk where disks usually reproduce data magnetically, while discs reproduce data optically with lasers. Combinations of the above should also be included within the scope of computer-readable media.

According to one aspect of the present disclosure, a method for uplink grant handling can include receiving an uplink grant at a user equipment from a network device. The method can also include associating the uplink grant directly with a logical channel group including a plurality of logical channels.

In some embodiments, the user equipment can be configured to dequeue the logical channel group directly with priority for transmission scheduling.

In some embodiments, the method can further include sending, to the network device from the user equipment, a request to associate a list of logical channel groups including the logical channel group. The request to associate can include a request to associate the plurality of logical channels with the logical channel group.

In some embodiments, the request to associate can further include a request to associate a latency with the logical channel group.

In some embodiments, the method can further include determining, by the user equipment, a latency of the uplink grant. The method can additionally include sending, to the network device responsive to the uplink grant, a buffer status report only of all logical channel groups associated with the latency.

In some embodiments, the latency can be a latency value or a latency range.

In some embodiments, the method can further include determining, by the user equipment, that a time since a last uplink grant for a plurality of logical channel groups exceeds a threshold. The method can additionally include sending, to the network device, a buffer status report of the plurality of logical channel groups.

According to another aspect of the present disclosure, a method for uplink grant handling can include sending an uplink grant from a network device to a user equipment. The method can also include receiving, from the user equipment responsive to the uplink grant, a request to associate a list of logical channel groups. The request to associate can include a request to associate a plurality of logical channels with the logical channel group. The method can further include sending, from the network device to the user equipment, a reconfiguration message confirming the list of logical channel groups and association with the plurality of logical channels.

In some embodiments, the method can also include sending, from the network device to the user equipment, a first latency uplink grant corresponding to a first logical channel group associated with a first latency. In some embodiments, the method can further include receiving, from the user equipment responsive to the first uplink grant, a buffer status report from the user equipment. The list of logical channel groups can include the first logical channel group.

In some embodiments, the method can also include sending, from the network device to the user equipment, a second latency uplink grant corresponding to a second logical channel group associated with a second latency. The method can further include receiving, from the user equipment responsive to the second uplink grant, a buffer status report from the user equipment. The list of logical channel groups can include the second logical channel group. The second latency can be different from the first latency, and the second logical channel group can be different from the first logical channel group.

In some embodiments, the first logical channel group can be indicated in the first uplink grant implicitly by indicating the first latency explicitly.

According to a further aspect of the present disclosure, a user equipment can include at least one processor and at least one memory including computer instructions. The at least one memory and the computer instructions can be configured to, with the at least one processor, cause the user equipment at least to receive an uplink grant at the user equipment from a network device. The at least one memory and the computer instructions can also be configured to, with the at least one processor, cause the user equipment at least to associate the uplink grant directly with a logical channel group including a plurality of logical channels.

In some embodiments, the user equipment can be configured to dequeue the logical channel group directly with priority for transmission scheduling.

In some embodiments, the at least one memory and the computer instructions can also be configured to, with the at least one processor, cause the user equipment at least to associate a list of logical channel groups including the logical channel group. The request to associate can include a request to associate the plurality of logical channels with the logical channel group.

In some embodiments, the request to associate can further include a request to associate a latency with the logical channel group.

In some embodiments, the at least one memory and the computer instructions can be configured to, with the at least one processor, cause the user equipment at least to determine, by the user equipment, a latency of the uplink grant. The at least one memory and the computer instructions can also be configured to, with the at least one processor, cause the user equipment at least to send, to the network device responsive to the uplink grant, a buffer status report only of all logical channel groups associated with the latency.

In some embodiments, the latency can be a latency value or a latency range.

In some embodiments, the at least one memory and the computer instructions can be configured to, with the at least one processor, cause the user equipment at least to determine, by the user equipment, that a time since a last uplink grant for a plurality of logical channel groups exceeds a threshold. The at least one memory and the computer instructions can also be configured to, with the at least one processor, cause the user equipment at least to send, to the network device, a buffer status report of the plurality of logical channel groups.

According to an additional aspect of the present disclosure, a network device can include at least one processor and at least one memory including computer instructions. The at least one memory and the computer instructions can be configured to, with the at least one processor, cause the network device at least to send an uplink grant from the network device to a user equipment. The at least one memory and the computer instructions can also be configured to, with the at least one processor, cause the network device at least to receive, from the user equipment responsive to the uplink grant, a request to associate a list of logical channel groups. The request to associate can include a request to associate a plurality of logical channels with the logical channel group. The at least one memory and the computer instructions can further be configured to, with the at least one processor, cause the network device at least to send, from the network device to the user equipment, a reconfiguration message confirming the list of logical channel groups and association with the plurality of logical channels.

In some embodiments, the at least one memory and the computer instructions can be configured to, with the at least one processor, cause the network device at least to send, from the network device to the user equipment, a first latency uplink grant corresponding to a first logical channel group associated with a first latency. The at least one memory and the computer instructions can also be configured to, with the at least one processor, cause the network device at least to receive, from the user equipment responsive to the first uplink grant, a buffer status report from the user equipment. The list of logical channel groups can include the first logical channel group.

In some embodiments, the at least one memory and the computer instructions can be configured to, with the at least one processor, cause the network device at least to send, from the network device to the user equipment, a second latency uplink grant corresponding to a second logical channel group associated with a second latency. The at least one memory and the computer instructions can also be configured to, with the at least one processor, cause the network device at least to receive, from the user equipment responsive to the second uplink grant, a buffer status report from the user equipment. The list of logical channel groups can include the second logical channel group. The second latency can be different from the first latency, and the second logical channel group can be different from the first logical channel group.

In some embodiments, the first logical channel group can be indicated in the first uplink grant implicitly by indicating the first latency explicitly.

According to yet another aspect of the present disclosure, a non-transitory computer-readable medium can be encoded with instructions that, when executed in a user equipment, perform a process for uplink grant handling. The process can include receiving an uplink grant at the user equipment from a network device. The process can also include associating the uplink grant directly with a logical channel group including a plurality of logical channels.

In some embodiments, the user equipment can be configured to dequeue the logical channel group directly with priority for transmission scheduling.

In some embodiments, the process can further include sending, to the network device from the user equipment, a request to associate a list of logical channel groups including the logical channel group. The request to associate can include a request to associate the plurality of logical channels with the logical channel group.

In some embodiments, the request to associate can further include a request to associate a latency with the logical channel group.

In some embodiments, the process can further include determining, by the user equipment, a latency of the uplink grant. The process can additionally include sending, to the network device responsive to the uplink grant, a buffer status report only of all logical channel groups associated with the latency.

In some embodiments, the latency can be a latency value or a latency range.

In some embodiments, the process can further include determining, by the user equipment, that a time since a last uplink grant for a plurality of logical channel groups exceeds a threshold. The process additionally includes sending, to the network device, a buffer status report of the plurality of logical channel groups.

According to a further aspect of the present disclosure, a non-transitory computer-readable medium can be encoded with instructions that, when executed in a network device, perform a process for uplink grant handling. The process can include sending an uplink grant from the network device to a user equipment. The process can also include receiving, from the user equipment responsive to the uplink grant, a request to associate a list of logical channel groups. The request to associate can include a request to associate a plurality of logical channels with the logical channel group. The process can further include sending, from the network device to the user equipment, a reconfiguration message confirming the list of logical channel groups and association with the plurality of logical channels.

In some embodiments, the process can further include sending, from the network device to the user equipment, a first latency uplink grant corresponding to a first logical channel group associated with a first latency. The process can additionally include receiving, from the user equipment responsive to the first uplink grant, a buffer status report from the user equipment. The list of logical channel groups can include the first logical channel group.

In some embodiments, the process can further include sending, from the network device to the user equipment, a second latency uplink grant corresponding to a second logical channel group associated with a second latency. The process can additionally include receiving, from the user equipment responsive to the second uplink grant, a buffer status report from the user equipment. The list of logical channel groups can include the second logical channel group. The second latency can be different from the first latency and the second logical channel group can be different from the first logical channel group.

In some embodiments, the first logical channel group can be indicated in the first uplink grant implicitly by indicating the first latency explicitly.

The foregoing description of the specific embodiments will so reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The particular arrangements provided are illustrative and without limitation. Accordingly, the functional blocks, modules, and steps may be re-ordered or combined in different ways than in the examples provided above. Likewise, some embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

What is claimed is:

1. A method for uplink grant handling, comprising:

receiving an uplink grant at a user equipment from a network device;

associating the uplink grant directly with a logical channel group comprising a plurality of logical channels; and sending, to the network device from the user equipment, a request to associate a list of logical channel groups comprising the logical channel group, wherein the request to associate comprises a request to associate the plurality of logical channels with the logical channel group;

wherein the associating is performed based on a mapping between a latency of the uplink grant and the logical channel group;

wherein the latency of the uplink grant refers to a time between when the uplink grant is provided to the user equipment and a scheduled transmission mentioned in the uplink grant.

2. The method of claim 1, wherein the user equipment is configured to dequeue the logical channel group directly with priority for transmission scheduling.

3. The method of claim 1, wherein the request to associate further comprises a request to associate the latency with the logical channel group.

4. The method of claim 1, further comprising:

determining, by the user equipment, the latency of the uplink grant; and sending, to the network device responsive to the uplink grant, a buffer status report only of all logical channel groups associated with the latency.

5. The method of claim 4, wherein the latency comprises a latency value or a latency range.

6. The method of claim 1, further comprising:

determining, by the user equipment, that a time since a last uplink grant for a plurality of logical channel groups exceeds a threshold; and sending, to the network device, a buffer status report of the plurality of logical channel groups.

7. A user equipment, comprising:

at least one processor; and at least one memory including computer instructions, wherein the at least one memory and the computer instructions are configured to, with the at least one processor, cause the user equipment at least to receive an uplink grant at the user equipment from a network device;

associate the uplink grant directly with a logical channel group comprising a plurality of logical channels; and send, to the network device from the user equipment, a request to associate a list of logical channel groups comprising the logical channel group, wherein the request to associate comprises a request to associate the plurality of logical channels with the logical channel group;

wherein the associating is performed based on a mapping between a latency of the uplink grant and the logical channel group;

wherein the latency of the uplink grant refers to a time between when the uplink grant is provided to the user equipment and a scheduled transmission mentioned in the uplink grant.

8. The user equipment of claim 7, wherein the user equipment is configured to dequeue the logical channel group directly with priority for transmission scheduling.

9. The user equipment of claim 7, wherein the request to associate further comprises a request to associate the latency with the logical channel group.

10. The user equipment of claim 7, wherein the at least one memory and the computer instructions are configured to, with the at least one processor, cause the user equipment at least to:

determine, by the user equipment, the latency of the uplink grant; and send, to the network device responsive to the uplink grant, a buffer status report only of all logical channel groups associated with the latency.

11. The user equipment of claim 10, wherein the latency comprises a latency value or a latency range.

12. The user equipment of claim 7, wherein the at least one memory and the computer instructions are configured to, with the at least one processor, cause the user equipment at least to:

determine, by the user equipment, that a time since a last uplink grant for a plurality of logical channel groups exceeds a threshold; and send, to the network device, a buffer status report of the plurality of logical channel groups.

13. A network device, comprising:

at least one processor; and at least one memory including computer instructions, wherein the at least one memory and the computer instructions are configured to, with the at least one processor, cause the network device at least to send an uplink grant from the network device to a user equipment so that the user equipment associates the uplink grant directly with a logical channel group comprising a plurality of logical channels;

receive, from the user equipment responsive to the uplink grant, a request to associate a list of logical channel groups, wherein the request to associate comprises a request to associate a plurality of logical channels with the logical channel group; and send, from the network device to the user equipment, a reconfiguration message confirming the list of logical channel groups and association with the plurality of logical channels;

wherein the associating the uplink grant directly with a logical channel group comprising a plurality of logical channels is performed based on a mapping between a latency of the uplink grant and the logical channel group;

wherein the latency of the uplink grant refers to a time between when the uplink grant is provided to the user equipment and a scheduled transmission mentioned in the uplink grant.

14. The network device of claim 13, wherein the at least one memory and the computer instructions are configured to, with the at least one processor, cause the network device at least to:

send, from the network device to the user equipment, a first latency uplink grant corresponding to a first logical channel group associated with a first latency; and receive, from the user equipment responsive to the first uplink grant, a buffer status report from the user equipment, wherein the list of logical channel groups comprises the first logical channel group.

15. The network device of claim 14, wherein the at least one memory and the computer instructions are configured to, with the at least one processor, cause the network device at least to:

send, from the network device to the user equipment, a
second latency uplink grant corresponding to a second
logical channel group associated with a second latency;
and receive, from the user equipment responsive to the second
uplink grant, a buffer status report from the user equip-
ment, wherein the list of logical channel groups comprises the
second logical channel group, and wherein the second latency is different from the first
latency, and the second logical channel group is differ-
ent from the first logical channel group.

16. The network device of claim 14, wherein the first
logical channel group is indicated in the first uplink grant
implicitly by indicating the first latency explicitly.

\* \* \* \* \*